(12) United States Patent
Alcouffe

(10) Patent No.: US 7,680,195 B2
(45) Date of Patent: Mar. 16, 2010

(54) COFDM DEMODULATOR WITH AN OPTIMAL FFT ANALYSIS WINDOW POSITIONING

(75) Inventor: Nicole Alcouffe, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 684 days.

(21) Appl. No.: 10/594,664

(22) PCT Filed: Mar. 30, 2005

(86) PCT No.: PCT/FR2005/050199

§ 371 (c)(1),
(2), (4) Date: Sep. 28, 2006

(87) PCT Pub. No.: WO2005/096581

PCT Pub. Date: Oct. 13, 2005

(65) Prior Publication Data

US 2007/0110173 A1    May 17, 2007

(30) Foreign Application Priority Data

Mar. 31, 2004    (FR)    .................................... 04 50634

(51) Int. Cl.
*H04L 27/28* (2006.01)
*H04B 1/10* (2006.01)
(52) U.S. Cl. ...................................... 375/260; 375/350
(58) Field of Classification Search ................. 375/260, 375/340, 343, 350; 370/208, 210
See application file for complete search history.

(56) References Cited

U.S. PATENT DOCUMENTS

| 6,421,401 | B1 * | 7/2002 | Palin ........................... 375/343 |
| 6,853,616 | B1 | 2/2005 | Kim et al. |
| 6,993,083 | B1 * | 1/2006 | Shirakata et al. ............ 375/260 |
| 2003/0138060 | A1 | 7/2003 | Alcouffe |
| 2003/0142764 | A1 * | 7/2003 | Keevill et al. ................ 375/341 |
| 2004/0105512 | A1 * | 6/2004 | Priotti ......................... 375/340 |

FOREIGN PATENT DOCUMENTS

| EP | 1 387 544 A | 2/2004 |
| WO | WO 0051301 A | 8/2000 |
| WO | WO 0169878 A | 9/2001 |

OTHER PUBLICATIONS

International Search Report from corresponding International Application No. PCT/FR2005/050199, filed Mar. 30, 2005.

* cited by examiner

*Primary Examiner*—Don N Vo
(74) *Attorney, Agent, or Firm*—Lisa K. Jorgenson; James H. Morris; Wolf, Greenfield & Sacks, P.C.

(57) ABSTRACT

The invention relates to a method for the COFDM demodulation of a signal received from a transmission channel. The inventive method includes performing the fast Fourier transform of the signal received in a window corresponding to a symbol, each symbol being associated with a guard time reproducing one part of the symbol; supplying a set of estimated values for the module impulse response; determining coefficients, each coefficient being obtained from the product of the aforementioned set and a filtering function (FE) for a determined relative position of the filtering function in relation to the set; determining the maximum coefficient and the corresponding relative position; and positioning the window as a function of the relative position, the filtering function including a central part (LMAX) which has a constant amplitude and a duration equal to the duration of the guard time and which is surrounded by non-zero decreasing edges.

9 Claims, 4 Drawing Sheets

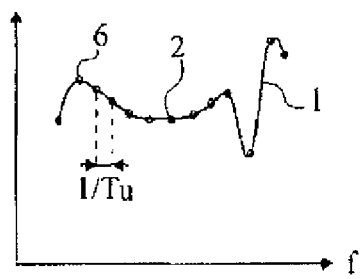
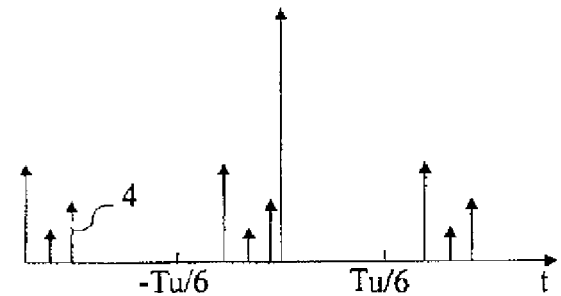
Fig 4A (Prior Art)    Fig 4B (Prior Art)
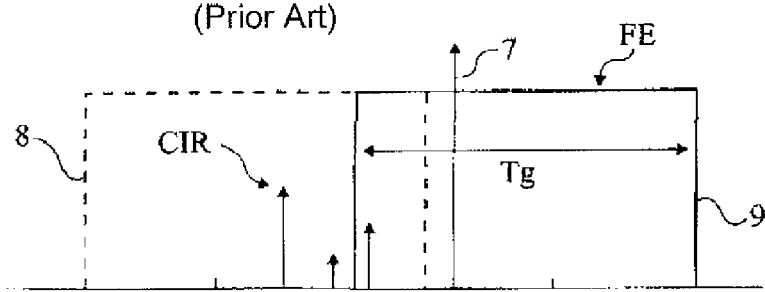
Fig 5 (Prior Art)
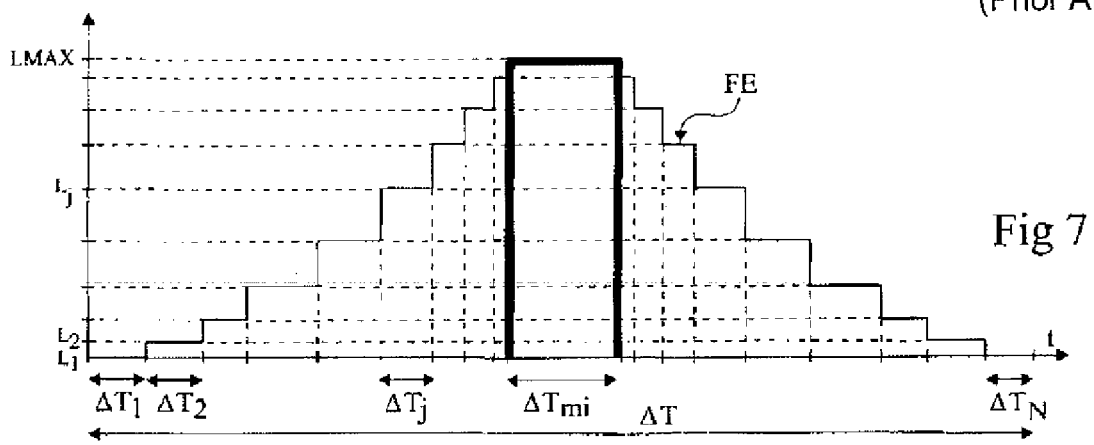
Fig 7
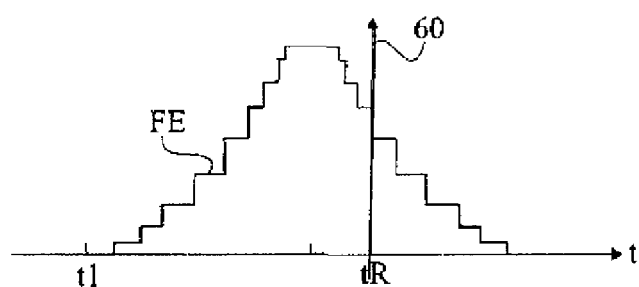
Fig 8
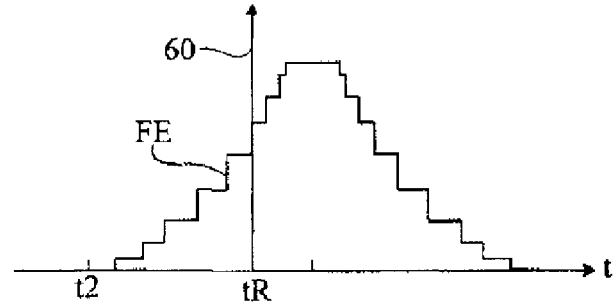
Fig 9

COFDM DEMODULATOR WITH AN OPTIMAL FFT ANALYSIS WINDOW POSITIONING

BACKGROUND OF THE INVENTION

1. Field of the Invention

The present invention relates to a Coded Orthogonal Frequency Division Multiplex (COFDM) demodulator.

2. Discussion of the Related Art

FIG. 1 is intended to illustrate the principle of a COFDM modulation. Data packets to be transmitted are put in the form of N complex coefficients associated with N respective frequencies (or carriers). Number N of the frequencies is equal, for example, to 1705 for the so-called "2K" mode and to 6817 for the so-called "8K" mode, in digital television radio transmission. Each complex coefficient corresponds to a vector which is illustrated in FIG. 1 as starting from a frequency axis at a point indicating the frequency associated with the coefficient.

The set of these N coefficients is processed by inverse fast Fourier transform (IFFT), which generates a "symbol" formed of a sum of modulated carriers, each carrier having an amplitude and a phase determined by the associated complex coefficient. The symbol thus generated is transmitted.

Conventionally, in radio transmission, the width of the transmission channel is 6, 7, or 8 MHz and each carrier is separated from the next one by a frequency difference $\Delta f = 1/T_u$. $T_u$ is the transmit time of a symbol and is called the useful duration. The useful duration is on the order of 224 µs in 2K mode and 896 µs in 8K mode, for a 8-MHz passband.

Upon reception, a receiver submits the symbol to the inverse processing, that is, mainly, a fast Fourier transform (FFT) to restore the initial complex coefficients.

As shown in FIG. 1, certain regularly distributed vectors P1, P2, P3 ... have a known constant value. These vectors, or the corresponding carriers, are said to be pilot. They are used to reflect the distortions undergone by the transmitted channel and by the information that they provide on the channel response, they enable correcting the unknown vectors located between the pilots.

FIG. 2 illustrates a transmission of several successive symbols Sn−1, Sn .... As shown, each of these symbols is preceded by a guard interval Tgn−1, Tgn, which is a copy of a portion of the end of the corresponding symbol. The guard intervals are often defined by a fraction of useful time period $T_u$. Conventional values of the guard interval are $T_u/32$, $T_u/16$, $T_u/8$, or $T_u/4$.

The guard intervals are used to avoid inter-symbol modulation distortions caused by an echo of the transmission. FIG. 2 also shows an echo SEn−1, TgEn−1 ... of the transmitted signal. This echo is delayed with respect to the main signal by a time period shorter than that of a guard interval Tg.

Each symbol S is normally analyzed by the FFT circuit of the receiver in a window W, or FFT analysis window, of same length as the symbol. If there was no guard interval, an analysis window W coinciding with a symbol of the main signal would be astride two symbols of the echo signal. This would cause an error which would be difficult to correct in the calculation of the FFT Fourier transform.

Guard interval Tg, provided that it is greater than the delay or the advance of the echo, provides an adjustment margin for analysis window W so that it only coincides with portions belonging to the same symbol, in the main signal as well as in the echo. The fact for an analysis window to be astride a symbol and its guard interval introduces a phase shift which is corrected by means of the above-mentioned pilots.

In FIG. 2, symbol Sn−1 must be analyzed in a window Wn−1 of duration $T_u$ that can be placed indifferently in a window delimited by times ta and tb, time ta corresponding to the beginning of the guard interval of echo TgEn−1, and time tb corresponding to the end of symbol Sn−1. Similarly, symbol Sn must be analyzed in a window Wn of duration $T_u$ that can be positioned indifferently in the window delimited by times tc and td, time tc corresponding to the beginning of the guard interval of echo TgEn, and time td corresponding to the end of symbol Sn.

FIG. 3 schematically shows the place of pilots in the symbols. The symbols are gathered in frames of 68 symbols, conventionally in digital television radio transmission (standard ETSI EN 300 744, V1.4.1).

In FIG. 3, each line represents a symbol and each box represents the position of a carrier. The carriers are defined as going from a position 0 to a position Kmax, Kmax being equal to 1704 in 2K mode and 6816 in 8K mode. Indeed, only a portion of the possible frequencies is used, especially due to risks of losses at the channel border. The pilots are of two types.

On the one hand, there are, in each symbol, continuous pilots Pc. The continuous pilots correspond to specific frequencies distributed in the channel. In the above-mentioned ETSI standard, there are 45 in 2K mode and 177 in 8K mode. The continuous pilots are present in all the symbols and always take up the same frequency position. In FIG. 3, only the continuous pilots corresponding to positions 0 and Kmax have been shown.

On the other hand, there are, in each symbol, so-called "scattered pilots" Pr, which are arranged every 12 carriers, and shifted by three positions between two successive symbols. Thus, every four symbols, the same arrangement of scattered pilots Pr can be found.

Initially, the FFT analysis windows are roughly positioned, for example, by a method of intercorrelation of the received signal. The continuous and scattered pilots, of constant amplitude on transmission, are then used to finely position analysis windows W.

For this purpose, at the receiver, the complex time received signal, after having been put in baseband, is provided to a fast Fourier transform unit providing the symbol in the frequency field. The pilots are sampled from this symbol. The sampled pilots enable estimation of the frequency response of the channel which, after having undergone an inverse Fourier transform, provides the estimation of the channel pulse response. The estimation of the channel pulse response is used to finely position analysis window W.

However, a problem exists due to the fact that the pilots provide but an incomplete description of the channel. Indeed, a taking into account of several successive symbols (at least 4) only enables having an image of the channel every three points. As a result, the estimation of the pulse response of the channel obtained from the pilots exhibits a periodization of period equal to useful duration $T_u$ divided by three.

FIG. 4A shows an example of a curve 1 representative of the module estimation of the frequency response of a transmit channel. Black disks 2 correspond to the points of curve 1 available from the continuous and scattered pilots of four successive symbols. The estimation of the pulse response of the transmit channel is obtained by the inverse Fourier transform (IFFT) of the points of the estimation of the frequency response obtained for the continuous and scattered pilots.

FIG. 4B shows the module estimation of the pulse response of the channel obtained from the points of the module estimation of the frequency response shown by the black disks in FIG. 4A. The module estimation of the pulse response is schematically shown by a periodic series of pulses 4 having a period equal to useful duration Tu divided by 3. For each period, a pulse corresponds to the main path taken by the signal and the other pulses correspond to echoes. In practice, the estimation of the pulse response corresponds more to a periodic series of "blunted" peaks.

FIG. 5 schematically illustrated the steps of a conventional method for positioning an analysis window of the FFT circuit based on the module estimation of the pulse response. The method comprises the steps of:

searching, over a period of the module estimation of the pulse response, pulse 7 of maximum amplitude which corresponds to the main path;

displacing a window FE, having its width corresponding to guard interval Tg, with respect to main path 7 from an initial position 8 (shown in dotted lines) to a final position 9 (shown in full line) and determining, for each position of window FE, the "energy" of the module estimation of the pulse response in window FE, the "energy" for example corresponding to the sum of the amplitudes present in window FE; and refining the positioning of analysis window W from the position of window FE corresponding to the maximum "energy".

The position of window FE corresponding to a maximum energy is generally further used to determine the estimation of the frequency response for the carriers other than continuous or distributed carriers, represented by white disks 6 in FIG. 4A. For this purpose, an interpolation filter is generally applied to the estimation of the pulse response, the positioning of which is refined according to the maximum energy position of window FE.

Such methods to refine the positioning of the FFT analysis window and the positioning of the interpolation filter are implemented on the demodulator referred to as STV0360 sold by the applicant.

In the previously-described method for positioning the FFT analysis window, the width of window FE is equal to guard interval Tg. This means that all the echoes outside the guard interval are not taken into account to refine the positioning of the FFT analysis window. However, echoes are generally present outside of the guard interval. The fact for them not to be taken into account to refine the positioning of the FFT analysis window may alter the quality of the demodulation. However, the width of window FE cannot be increased beyond the guard interval since this risks making the FFT analysis window positioning method unstable.

SUMMARY OF THE INVENTION

An object of the present invention is to provide an optimal positioning method of the FFT analysis window for a COFDM demodulator enabling taking into account echoes outside the guard interval.

To achieve this object, the present invention provides a method of COFDM demodulation of a signal received from a transmit channel, comprising the steps of performing the fast Fourier transform of the received signal in a window corresponding to a symbol, each symbol comprising several carriers modulated in phase and/or in amplitude, some of which are pilots, and being adjacent to a guard interval reproducing part of the symbol; providing a set of estimated values of the pulse response in module from the pilots; determining coefficients, each coefficient being obtained from the product of said set and of a filtering function for a determined relative position of the filtering function with respect to said set; determining the maximum coefficient and the corresponding relative position; and positioning said window according to said relative position corresponding to the maximum coefficient, the filtering function comprising a central portion of constant amplitude and of duration equal to the duration of the guard interval, surrounded with non-zero decreasing sides.

According to an embodiment of the present invention, the step of providing the set of estimated values of the pulse response in module comprises a step of provision of a set of estimated values of the frequency response of the transmit channel based on the pilots, and a step of transformation of said set of estimated values of the frequency response by inverse fast Fourier transform.

According to an embodiment of the present invention, for each relative position of the filtering function with respect to the set of estimated values of the pulse response in module, the coefficient is determined based on the sum of the products of the estimated values of the pulse response in module and of the filtering function.

According to an embodiment of the present invention, the set of estimated values of the pulse response in module is periodic, the filtering function having a total width smaller than the period of the set of estimated values of the pulse response in module.

According to an embodiment of the present invention, the filtering function is a stepped function.

According to an embodiment of the present invention, each side comprises at least a first and a second adjacent steps each having a non-zero amplitude strictly smaller than the amplitude of the central portion, the double of the amplitude of the second step being greater than the sum of the amplitude of the central portion and of the amplitude of the first step.

According to an embodiment of the present invention, the duration of the second step is smaller than the duration of the first step.

According to an embodiment of the present invention, the filtering function is symmetrical.

The present invention also provides a COFDM demodulator intended to receive a signal received from a transmit channel, comprising a circuit of fast Fourier transform of the received signal in a window corresponding to a symbol, each symbol comprising several carriers modulated in phase and/or in amplitude, some of which are pilots, and being adjacent to a guard interval reproducing part of the symbol; a circuit for providing a set of estimated values of the pulse response in module from the pilots; a circuit for determining coefficients, each coefficient being obtained from the product of said set and of a filtering function for a determined relative position of the filtering function with respect to said set; a circuit for determining the maximum coefficient and the corresponding relative position; and a circuit for positioning said window according to said relative position corresponding to the maximum coefficient, the filtering function comprising a central portion of constant amplitude and of duration equal to the duration of the guard interval, surrounded with non-zero decreasing sides.

BRIEF DESCRIPTION OF THE DRAWINGS

The foregoing object, features, and advantages, as well as others, of the present invention will be discussed in detail in the following non-limiting description of specific embodiments in connection with the accompanying drawings.

FIGS. 4A and 4B, previously described, schematically show examples of the module estimations of the frequency response and of the pulse response of the transmit channel;

FIG. 5, previously described, illustrates an example of a conventional method for positioning the FFT analysis window;

FIG. 7 shows an example of the forming of a filtering function implemented by the method according to the present invention of FFT analysis window positioning;

FIGS. 8 and 9 illustrate steps of the method according to the present invention for positioning the FFT analysis window; and FIGS. 10A, 10B to 13A, 13B illustrate certain advantages of the method according to the present invention of FFT analysis window positioning.

DETAILED DESCRIPTION

Figure 1:
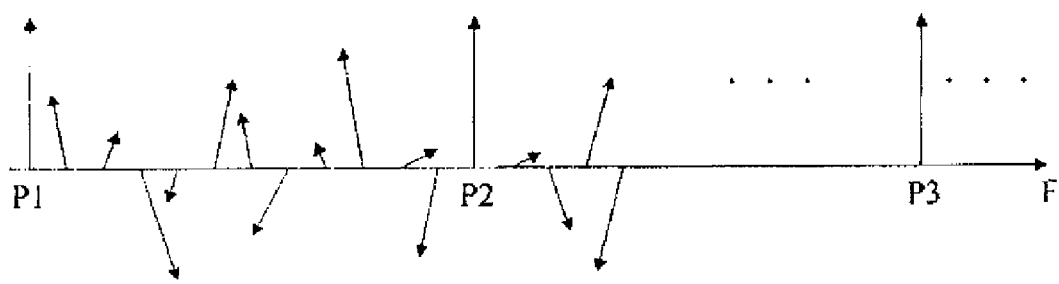
FIG. 1, previously described, shows phase- and amplitude-modulated carriers in a COFDM transmission system.
Figure 2:
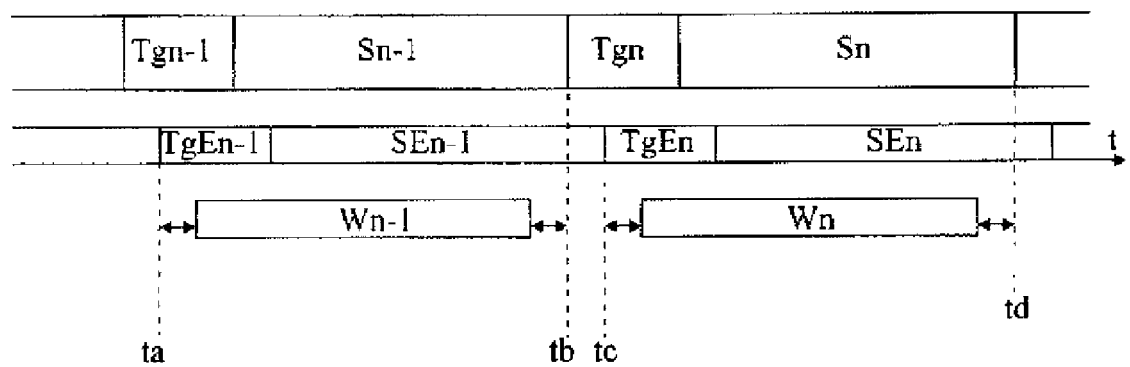
FIG. 2, previously described, shows signals received by a COFDM demodulator and windows of FFT analysis of the signals.
Figure 3:
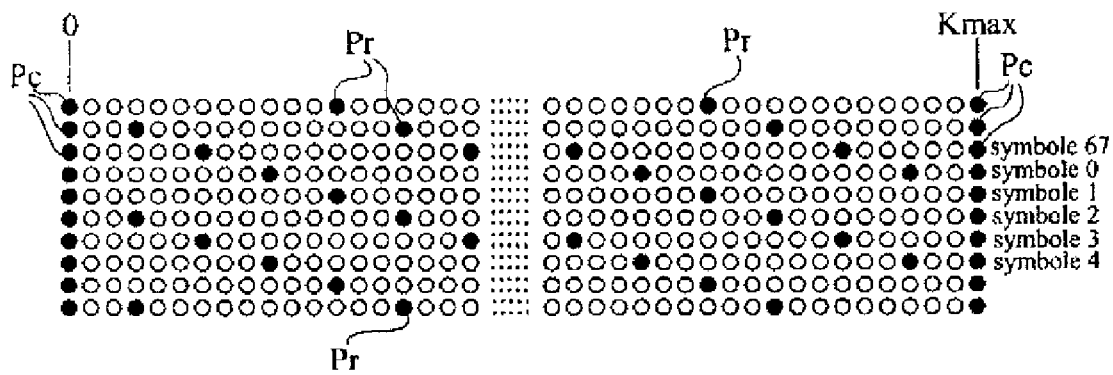
FIG. 3, previously described, schematically shows the position of pilots in symbols.
Figure 6:
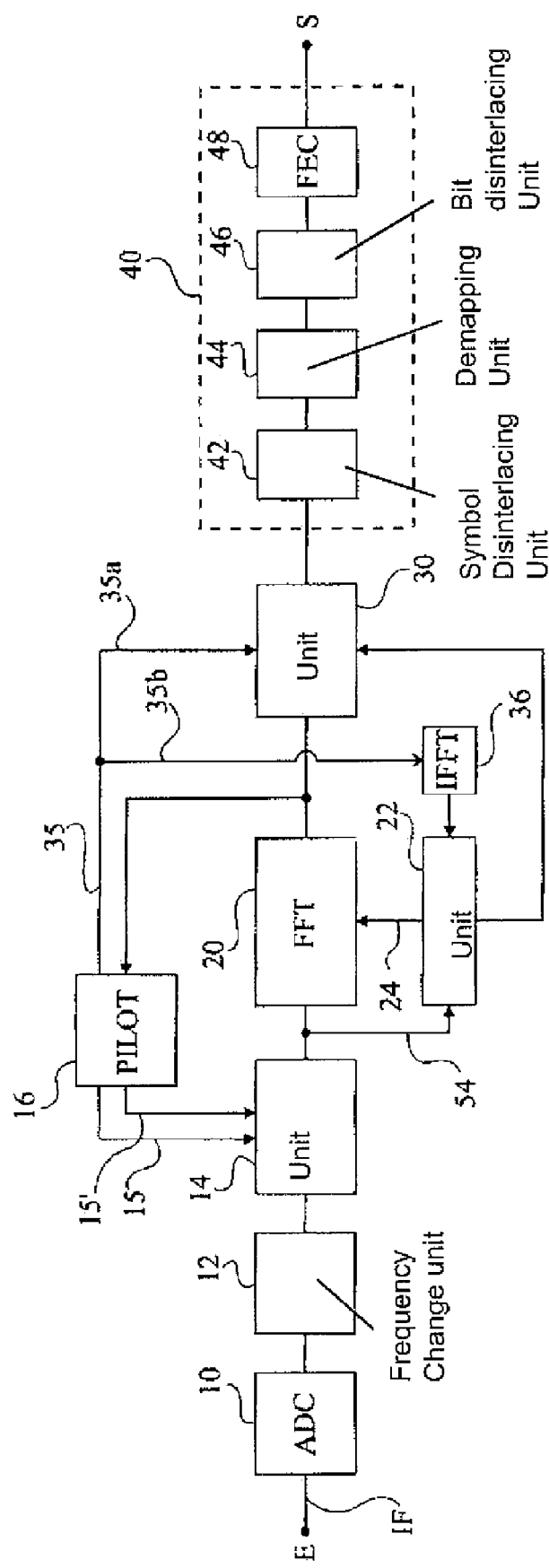
FIG. 6 shows an example of the forming of a demodulator according to the present invention.

FIG. 6 shows an example of a COFDM demodulator according to the present invention. The received signal comprises continuous pilots, scattered pilots, and data carriers.

In FIG. 6, an input E of the demodulator receives a signal IF of intermediary frequency enabling sampling, for example, 36 MHz. Signal IF corresponds to the signal received after various frequency changes or transpositions.

Input E is coupled to an analog-to-digital converter 10 (ADC) which digitizes input signal IF. Analog-to-digital converter 10 drives a frequency change unit 12. Unit 12 provides a signal substantially in baseband, the signal spectrum at the output of unit 12 being centered on a frequency substantially equal to zero. Unit 12 is coupled to a unit 14, enabling on the one hand fine setting of the central frequency of the signal spectrum and, on the other hand, providing time samples at times appropriate to the subsequent processing. At the output of unit 14, the signal spectrum is centered on a frequency equal to 0 and the number and the time position of the samples are adapted to the transformation by Fourier transform which is performed in the next unit. Unit 14 is controlled by connections 15 and 15' connecting unit 14 to a unit 16 for processing the continuous and scattered pilots.

The output of unit 14 drives a fast Fourier transform unit 20 (FFT) which provides the frequencies corresponding to a symbol. Unit 20 is driven by a unit 22 which provides, via a connection 24, a signal for setting the analysis window of the Fourier transform.

The output of unit 20 is coupled to unit 16 which performs the extraction and the processing of the continuous and scattered pilots. Unit 16 provides on connections 15 and 15' the signals intended to correct the central frequency of the spectrum and of the sampling frequency of the signal.

The output of unit 20 drives a unit 30 in which the signal is connected by means of an estimation of the frequency response of the signal. The estimation of the frequency response of the channel is performed in unit 16 by means of the pilots. This estimation is provided by unit 16 on a connection 35, having a branch 35a coupled to unit 30. At the output of unit 30, the signal especially comprises the carriers conveying the data.

The estimation of the frequency response of the channel, provided by unit 16, supplies, via connection 35 and a branch 35b of connection 35, an inverse fast Fourier transform unit 36 (IFFT), to determine the pulse response of the channel. Unit 36 provides the pulse response of the channel to unit 22, to dynamically adjust the positioning of the FFT analysis window. Unit 22 is connected to unit 30 to dynamically adjust the position of an interpolation filter used to determine the estimation of the channel frequency response for carriers other than the continuous and scattered pilots.

The processing of the carriers conveying the data is ensured in a data processing and provision circuit 40. Circuit 40 has a conventional structure and may comprise, as shown in FIG. 4, a symbol disinterlacing unit 42, a so-called "demapping" unit 44, a bit disinterlacing unit 46, and an error correction unit 48 (FEC). The output of unit 48 forms output S of circuit 40 and of the demodulator and provides data corresponding to the transmitted data.

The method to refine the positioning of the FFT analysis window comprises the previously-described steps. The present invention consists of using a specific filtering function instead of previously-described window FE enabling taking into account certain echoes outside of the guard interval.

FIG. 7 shows an example of a filtering function FE according to the present invention. The scales, especially according to the time axis, are not respected.

In the present example of implementation, filtering function FE comprises N successive steps. Each step of index j, j=1 to N, is characterized by a duration $\Delta T_j$ and by an amplitude $L_j$. The determination of the energy of the module estimation of the pulse response with respect to filtering function FE may be performed from a portion of the module estimation of the pulse response of the channel of duration equal to the period of the module estimation of the pulse response, that is, equal to useful duration Tu divided by 3 in the present example. The total sum of durations $\Delta T_j$, j=1 to N, can then be greater than the period of the module estimation of the pulse response. However, the determination of the energy of the module estimation of the pulse response with respect to filtering function FE can be performed based on the entire module estimation of the pulse response. The total sum of durations $\Delta T_j$, j=1 to N, is then smaller than the period of the module estimation of the pulse response.

Amplitudes $L_j$ increase from amplitude $L_1$ of the first step to a maximum amplitude LMAX corresponding to a step of index mi, then decreases from maximum amplitude LMAX to amplitude $L_N$ of the last step of index N. Duration $\Delta T_{mi}$ of the step of index mi is equal to the duration of guard interval Tg. The filtering function can be considered as having a constant central portion, the step of index mi, surrounded with decreasing sides, the steps of indexes j=1 to mi−1 and j=mi+1 to N. The decreasing sides are non-zero since at least one of amplitudes $L_j$ for j=1 to mi−1 and for j=mi+1 to N is different from zero.

Durations $\Delta T_j$, j=1 to N, are such that:

$$\frac{\Delta T_{mi}}{2} + \sum_{j=1}^{mi-1} \Delta T_j = \frac{\Delta T}{2}$$

This means that the step of index mi is substantially located at the center of filtering function FE.

Amplitude $L_j$ of the step of index j follows the following relation, for j=1 to N:

$2 \times L_j \geq L_{j-1} + L_{j+1}$

As an example, the following relations apply:

$\Delta T_{j+1} > \Delta T_j$ at least for $mi < j \leq mi+4$ $\Delta T_{j+1} < \Delta T_j$ at least for $mi-4 \leq j < mi$ More specifically, advantageously, the following relations apply:

$\Delta T_{j+1} > 1.5 \times \Delta T_j$ at least for $mi < j \leq mi+4$ $\Delta T_{j+1} < 1.5 \times \Delta T_j$ at least for $mi-4 \leq j < mi$ Advantageously, number N of steps is odd. As an example, 19 steps are shown in FIG. 7. Further, filtering function FE is advantageously symmetrical, which translates, for j=1 to N, as the following relations:

$\Delta T_j = \Delta T_{N+1-j}$ $L_j = L_{N+1-j}$

Generally, for each index, amplitude $L_j$ and duration $\Delta T_j$ are set according to the used modulation, especially according to the duration of guard interval Tg. Further, whatever the used modulation, amplitudes $L_1$ and $L_N$ respectively associated with the steps of indexes 1 and N are equal.

FIGS. 8 and 9 schematically illustrate two steps of the method for positioning the FFT analysis window according to the present invention implementing filtering function FE shown in FIG. 7. The scales, according to the time axis, are not respected. As described previously, to determine the energy of the estimation of the pulse response with respect to filtering function FE, a portion only of the module estimation of the pulse response having a duration equal to a period of the module estimation of the pulse response. Said portion of the estimation of the pulse response is then determined by any adapted method. A first step of the method then consists of searching, over said portion of the module estimation of the pulse response of the channel, the pulse having a maximum amplitude. Such an pulse is associated with a reference time tR and is considered as corresponding to the main path taken by the signal received by the demodulator. In the case where the entire module estimation of the pulse response is used, the main path is determined by any adapted method.

Filtering function FE is then displaced with respect to time tR from an initial time t1, smaller than tR, to a final time t2, greater than t1 and smaller than tR, so that the step of index mi is located at initial time t1 before main path 60, and at final time t2 after main path 60.

For a determined position of filtering function FE, the energy of the estimation of the pulse response with respect to filtering function FE is obtained by multiplying the amplitude of each echo by the amplitude of the step containing said echo, by multiplying the amplitude of the main path by the amplitude of the step containing the main path and by adding the amplitudes thus weighted. In practice, the module estimation of the pulse response is stored in the form of a table containing indexes representative of successive times, a value of the module estimation of the pulse response being associated with each index. An analog table representative of filtering function FE is then determined at the initial position at time t1. In the case where a single portion of the pulse response is used to determine the energy, a portion only of the table representative of the module estimation of the pulse response is kept. The energy of the module estimation of the pulse response with respect to filtering function FE at initial position t1 is obtained by multiplying, for each index, the values stored in the tables representative of the filtering function and of the module estimation of the pulse response, and by adding the obtained products. Shifting the filtering function with respect to the module estimation of the pulse response then amounts to shifting the indexes of the table representative of the filtering function.

The applicant has shown that the use of a filtering function FE such as defined by the previously-mentioned characteristics advantageously enables taking into account the echoes outside of the guard interval for the positioning of the FFT analysis window while avoiding an instability of the method.

Figure 10A:
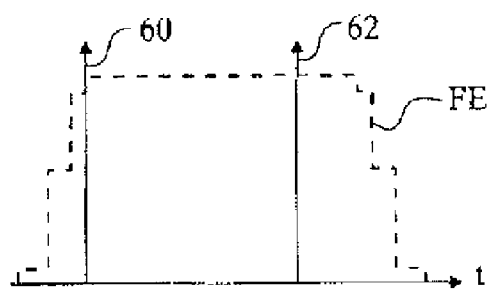
Figure 10B:
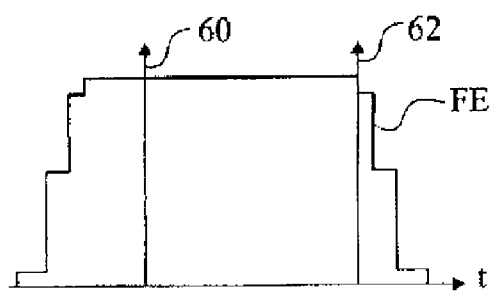
Figure 11A:
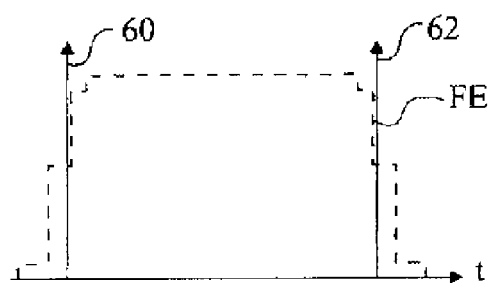
Figure 11B:
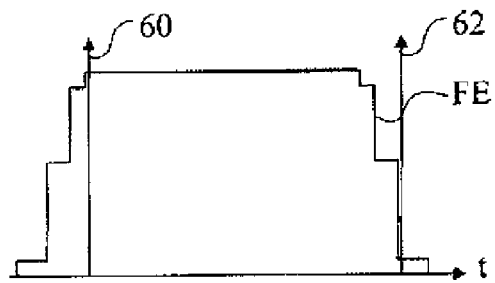
Figure 12A:
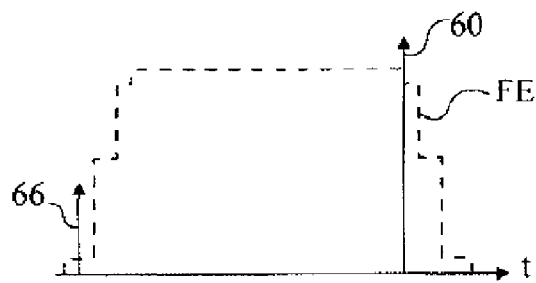
Figure 12B:
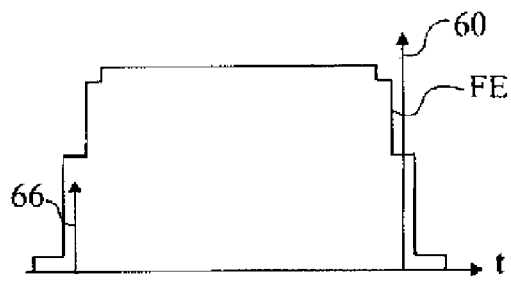
Figure 13A:
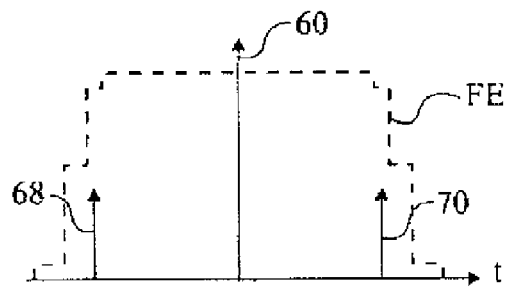
Figure 13B:
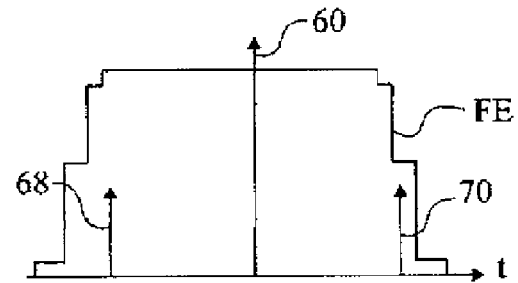

In FIGS. 10A, 10B to 13A, 13B, which illustrate the advantages of the present invention, filtering function FE is shown, for simplicity, with a smaller number of steps than the filtering function of FIG. 7. Each FIG. 10A, 10B to 13A, 13B shows a portion of the module estimation of the pulse response of the channel, and more specifically main path 60 and an additional echo (FIGS. 10A, 10B to 12A, 12B) or two additional echoes (FIGS. 13A, 13B). For each pair of FIGS. 10A, 10B, 12A, 12B, and 13A, 13B, the relative positions between the main path and the additional echo(es) are identical. FIGS. 10A, 10B (respectively 12A, 12B, and 13A, 13B) show two positions of filtering function FE with respect to the module estimation of the pulse response and illustrate which position of filtering function FE corresponds to a maximum energy.

FIGS. 10A, 10B illustrate the case in which an echo 62 substantially of same amplitude as main path 60 is separated therefrom by a duration smaller than the duration of the step of index mi, that is, of a duration smaller than the duration of guard interval Tg. In this case, whatever the position of filtering function FE between the position shown in FIG. 10A and the position shown in FIG. 10B, the energy of the module estimation of the pulse response is identical. A conventional result obtained with a window having a width equal to guard interval Tg is then found.

FIGS. 11A, 11B illustrate the case in which an echo 64 is substantially of same amplitude as main path 60 is present outside of guard interval Tg, that is, the duration between main path 60 and echo 64 is greater than the duration of guard interval Tg. In this case, the obtained energy is greater when filtering function FE occupies the position shown in FIG. 11A with respect to the position shown in FIG. 11B. The positioning of the FFT analysis window is thus determined from the position of the filtering function corresponding to FIG. 11A. The present invention thus enables taking into account echoes of strong amplitude outside of the guard interval.

FIGS. 12A, 12B illustrate the case in which an echo 66 having an amplitude smaller than the main path is present outside of the guard interval. In this case, the obtained energy is greater when filtering function FE occupies the position shown in FIG. 12A with respect to the position shown in FIG. 12B. This means that the participation of an echo 66 of small amplitude outside of guard interval Tg is smaller than the participation of main path 60 for the positioning of the FFT analysis window.

FIGS. 13A, 13B illustrate the case in which two echoes 68, 70 of small identical amplitudes are arranged symmetrically on either side of main path 60, the duration separating each echo 68, 70 and main path 60 being greater than half of the duration of guard interval Tg. In this case, the obtained energy is maximum when filtering function FE occupies the position shown in FIG. 13A with respect to the position shown in FIG. 13B. This means that echoes of same amplitude symmetrical with respect to the main path outside of the guard interval have an identical participation for the positioning of the FFT analysis window.

The present invention thus enables taking into account echoes outside of the guard interval for the positioning of the FFT analysis window, while weighting the participation assigned by such echoes according to their amplitude and to the deviation with respect to the main path, enabling avoiding an instability of the method for positioning the FFT analysis window.

The position of maximum energy obtained from filtering function FE can be used to refine the positioning of the interpolation filter implemented to determine the estimation of the frequency response of the channel for carriers other than the continuous and scattered pilots.

Of course, the present invention is likely to have various, alterations, improvements, and modifications which will readily occur to those skilled in the art. In particular, in the example of demodulator of FIG. 6, all units may be modified or replaced with appropriate elements. For example, input E of the circuit can directly receive a signal centered on approximately 4.5 MHz. The analog-to-digital converter may be external to the demodulator.

The present invention has mainly been described in the context of the digital television radio transmission, defined by standard ETSI EN 300 744, V1.4.1. However, the present invention is neither limited to this standard, nor to this field, and may be applied in and to any device comprising a COFDM demodulator, be it a television receiver or not. For example, the demodulator according to the present invention may be used in a portable phone.

Further, filtering function FE has been described in the context of a digital signal processing method. Clearly, the present invention may be implemented in the context of an analog signal processing method, the filtering function used being a continuous function then corresponding to the previously-described stepped function.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of COFDM demodulation of a signal received from a transmit channel, comprising:

performing a fast Fourier transform of the received signal in a window corresponding to a symbol, each symbol comprising several carriers modulated in phase and/or in amplitude, some of which are pilots, and being adjacent to a guard interval reproducing part of the symbol;

providing a set of estimated values of the pulse response in module from the pilots;

determining coefficients, each coefficient being obtained from the product of said set and of a filtering function for a determined relative position of the filtering function with respect to said set;

determining the maximum coefficient and the corresponding relative position; and positioning said window according to said relative position corresponding to the maximum coefficient, the filtering function comprising a central portion of constant amplitude and of duration equal to the duration of the guard interval, surrounded with non-zero decreasing sides.

2. The method of claim 1, wherein providing the set of estimated values of the pulse response in module comprises providing a set of estimated values of the frequency response of the transmit channel based on the pilots, and a step of transformation of said set of estimated values of the frequency response by inverse fast Fourier transform.

3. The method of claim 1, wherein, for each relative position of the filtering function with respect to the set of estimated values of the module of the pulse response, the coefficient is determined based on the sum of the products of the module of the estimated values of the pulse response and of the filtering function.

4. The method of claim 1, wherein the set of estimated values of the module of the pulse response is periodic, the filtering function having a total width smaller than the period of the set of estimated values of the module of the pulse response.

5. The method of claim 1, wherein the filtering function is a stepped function.

6. The method of claim 5, wherein each side comprises at least a first and a second adjacent steps each having a non-zero amplitude strictly smaller than the amplitude of the central portion, the double of the amplitude of the second step being greater than the sum of the amplitude of the central portion and of the amplitude of the first step.

7. The method of claim 6, wherein the duration of the second step is smaller than the duration of the first step.

8. The method of claim 1, wherein the filtering function is symmetrical.

9. A COFDM demodulator intended to receive a signal received from a transmit channel, comprising:

a circuit of fast Fourier transform of the received signal in a window corresponding to a symbol, each symbol comprising several carriers modulated in phase and/or in amplitude, some of which are pilots, and being adjacent to a guard interval reproducing part of the symbol;

a circuit for providing a set of estimated values of the module of the pulse response from the pilots;

a circuit for determining coefficients, each coefficient being obtained from the product of said set and of a filtering function for a determined relative position of the filtering function with respect to said set;

a circuit for determining the maximum coefficient and the corresponding relative position; and a circuit for positioning said window according to said relative position corresponding to the maximum coefficient, the filtering function comprising a central portion of constant amplitude and of duration equal to the duration of the guard interval, surrounded with non-zero decreasing sides.

* * * * *